United States Patent [19]

Miller et al.

[11] Patent Number: 5,364,892
[45] Date of Patent: * Nov. 15, 1994

[54] MODELING DOUGH

[75] Inventors: Richard E. Miller, Nazareth; Karen Mariano, Easton, both of Pa.

[73] Assignee: Binney & Smith, Inc., Easton, Pa.

[ * ] Notice: The portion of the term of this patent subsequent to Dec. 15, 2009 has been disclaimed.

[21] Appl. No.: 990,599

[22] Filed: Dec. 14, 1992

Related U.S. Application Data

[63] Continuation-in-part of Ser. No. 734,951, Jul. 24, 1991, Pat. No. 5,171,766.

[51] Int. Cl.$^5$ .................. C08J 9/32; C08K 3/26; C08K 3/38; C08L 29/04
[52] U.S. Cl. .................... 523/218; 523/204; 523/207; 524/427; 524/557; 524/405
[58] Field of Search ............ 523/204, 207, 218, 223; 524/425, 503, 557, 803, 427, 405

[56] References Cited

U.S. PATENT DOCUMENTS

| | | | |
|---|---|---|---|
| 3,135,648 | 6/1964 | Hawkins | 524/557 |
| 3,143,518 | 8/1964 | Smith | 524/557 |
| 3,167,440 | 1/1965 | McVicker | 106/150 |
| 3,558,340 | 1/1971 | Spector | 117/26 |
| 3,607,332 | 9/1971 | Wingfield | 106/243 |
| 3,632,786 | 1/1972 | Nickerson | 524/503 |
| 3,714,086 | 1/1973 | Schaefer | 524/557 |
| 3,873,485 | 3/1975 | Fichera | 260/29.2 EP |
| 3,886,112 | 5/1975 | Watson et al. | 260/33.4 R |
| 3,961,967 | 6/1976 | Brooks | 106/37 |
| 4,076,547 | 2/1978 | Lester et al. | 106/779 |
| 4,094,694 | 6/1978 | Long | 524/557 |
| 4,172,054 | 10/1979 | Ogawa et al. | 524/18 |
| 4,336,071 | 6/1982 | Schnorrer | 106/170 |
| 4,386,964 | 6/1983 | Herbert | 106/150 |
| 4,469,837 | 9/1984 | Cattaneo | 524/388 |
| 5,157,063 | 10/1992 | Wetherell | 524/503 |

FOREIGN PATENT DOCUMENTS

| | | |
|---|---|---|
| 0075934 | 9/1982 | European Pat. Off. |
| 115162 | 10/1974 | Japan |
| 063622 | 5/1978 | Japan |
| 0036538 | 4/1981 | Japan |
| 343552 | 7/1981 | U.S.S.R. |

*Primary Examiner*—Peter Szekely
*Attorney, Agent, or Firm*—Leydig, Voit & Mayer, Ltd.

[57] ABSTRACT

A modeling dough comprising gelled poly(vinyl alcohol), water and a filler provides a dough resistant to flaking, cracking, and crumbling. In the disclosed invention, the poly(vinyl alcohol) resin is gelled, thereby providing a water-based resin system that is not sticky yet very ductile. Prior to drying, the dough also exhibits the properties of bounceability and the ability to pick up newsprint. After the dough is air-dried, the poly resin serves to bind the components into a solid, durable product. The filler accounts for a large portion of the volume of the dough, so the overall volume is not greatly affected by water loss upon drying. The dough is water-based and easy to wash from skin, carpets, and other surfaces. Dyes and pigments can be easily incorporated into the formula. The dried product is sandable and paintable.

23 Claims, No Drawings

MODELING DOUGH

RELATED APPLICATION

This is a continuation-in-part of our prior U.S. patent application Ser. No. 07/734,951, filed Jul. 24, 1991 now U.S. Pat. No. 5,171,766. The entire disclosure of the '951 application is incorporated herein by reference.

FIELD OF THE INVENTION

The present invention relates to an improved water-based modeling dough for use by children and artists in general. Specifically, the present invention relates to an improved water-based modeling dough for use by children and artists in general. Specifically, the present invention relates to an improved water-based modeling dough having a gelled poly(vinyl alcohol) resin and a filler, which bind to form a matrix. The present invention provides an improved water-based modeling dough which forms a solid, lightweight, durable product upon drying.

BACKGROUND OF THE INVENTION

The present invention does not relate to oil-based clays comprising naturally occurring clays that are mined as rocks. Rather, the present invention relates to man-made, water-based modeling doughs.

Non oil-based modeling doughs are normally air-dryable and incorporate starch as the filler. These doughs have a tendency to flake, crack, and crumble in both the wet and dry stages. These doughs also shrink substantially upon drying. In other words, these doughs are characterized by poor plasticity, poor dry strength and substantial drying shrinkage.

Plasticity is the property of a wet dough or clay that permits deformation by application of a relatively slight pressure and retention of the deformed shape after release of the pressure. This property distinguishes the dough in its wet stage from its dry stage. When wet, starch-based modeling doughs have a low plasticity and have a tendency to break apart during the molding or manipulating process. These doughs also have a tendency to crack when dry and are not easily shaped in the dry state by sanding or filing. Furthermore, the artist cannot easily add wet dough to the existing dried sculpture. Finally, artists cannot carve dried starch-based doughs.

Another problem inherent with water-based doughs is the loss of volume (shrinkage) upon drying. Because water accounts for a large portion of the volume of the dough in its wet stage, water loss upon drying results in a loss of volume in the resulting molded product.

One attempt to overcome the shrinkage problem has been to incorporate large proportions of filler in the dough mixture, but there is still shrinkage because the volume decreases as the filler binds together after drying. One commercially available children's dough, for example, shrinks about 20% upon drying despite its high filler content. In other words, a sculpture made with that dough can lose about 20% of its total volume upon drying. Moreover, the use of large proportions of filler aggravates the flaking, cracking and crumbling problem discussed above, and also tends to decrease the dry strength of the molded sculpture.

Discoloration upon drying is another problem associated with water-based doughs and is compounded by the dry shrinkage discussed above. As the volume decreases, the concentration of the pigment increases and the color darkens.

Yet another problem associated with conventional water-based doughs is that they are heavy and hard to manipulate. Dense, heavy doughs are awkward and the child or artist is limited in the types of shapes that can be created without the dough falling apart.

Finally, currently available water-based doughs are destructive to textiles, carpeting, furniture and other surfaces. They tend to stain a surface and are not easily removed by washing.

In light of the above problems, the need arises for a water-based air-drying dough that is easily washed from textiles, carpeting and other surfaces. Furthermore, the water-based, air-drying dough must be able to incorporate dyes and pigments and not discolor upon drying.

SUMMARY OF THE INVENTION

The discovery of the present invention is that one may formulate a superior modeling dough by combining gelled poly(vinyl alcohol) resin, a filler and water to form a cohesive water soluble resin system. The water evaporates upon drying to leave a gelled poly(vinyl alcohol)-filler material that is both lightweight and durable.

In one preferred form, the composition of the invention includes from about 4% to about 15% poly(vinyl alcohol), from about 0.1% to about 2% gellant, from about 40% to about 60% water and from about 10% to about 30% filler.

Optionally, the composition of the invention may include one or more of a buffer, a defoamer, a wetting agent, a humectant, a preservative, and colorants.

When the preferred fillers are used, the doughs disclosed have a density of less than 0.48 g/cc. Previously known water-based doughs incorporating starch as the filler have a density of about 1.25 g/cc, and natural clays have densities of 2.50 g/cc. Thus, the dough disclosed by the present invention is substantially lighter than modeling doughs and clays previously available. Further, the doughs disclosed by the present invention have a very limited amount of dry shrinkage, are extrudable when wet, and are sandable, carvable, and paintable when dry.

Therefore, one general object of the invention is to provide a lightweight water-based air-drying modeling dough that contains a cohesive water-soluble resin system and that is resistant to flaking, cracking, and crumbling.

A further object of the invention is to provide a lightweight water-based air-drying modeling dough that does not substantially shrink in volume upon drying.

Another object of the invention is to provide a water-based air-drying modeling dough incorporating a gelled resin with a high degree of plasticity, wet ductility, and extrudability, yet a low degree of stickiness in the wet product.

Yet another object of the invention is to provide a water-based air-drying modeling dough that is sandable and carvable after drying.

A still further object of the invention is to provide a water-based air-drying modeling dough that enables the artist to add wet dough to the existing dried sculpture.

An additional object of the invention is to provide a water-based air-drying modeling dough with the ability to pick up newsprint.

Another object of the invention is to provide a water-based, air-drying modeling dough incorporating dyes, colorants and pigments and which does not discolor upon drying.

Yet another object of the invention is to provide a water-based air-drying modeling dough with the ability to bounce.

And, another object of the invention is to provide a water-based air-drying modeling dough that is more easily washed from skin, carpeting, textiles and other surfaces compared to other modeling compounds.

Further and additional objects will appear from the description and appended claims.

DETAILED DESCRIPTION

To achieve the foregoing and other objects in accordance with the purposes of the present invention, as embodied and broadly claimed herein, the modeling dough disclosed in the present invention comprises from about 40% to about 60% water, from about 4% to about 15% poly(vinyl alcohol) resin, from about 10% to about 30% filler and from about 0.2% to about 2% gellants.

A preferred formulation of the dough of the present invention comprises from about 43% to 49% water, from about 8% to about 12% poly(vinyl alcohol) resin, from about 25% to about 26% filler, and from about 0.15% to about 0.3% gellant.

The poly(vinyl alcohol) resin binds with the filler upon drying, thereby avoiding the flaking, cracking and crumbling problems associated with prior compositions. The poly(vinyl alcohol) gives the dough its ductility and plasticity qualities while wet.

However, employing poly(vinyl alcohol) as a resin can result in a dough that is sticky and hard to manipulate. Therefore, a gellant, such as a water soluble borate salt, in an amount of from about 0.15% to about 2% by weight, is used to gel the resin substantially, eliminate stickiness, and impart wet ductility to the resulting dough. Preferably, the gellant is used in compositions of the invention in an amount of from about 0.15% to about 0.30% by weight.

Most water soluble borate salts are acceptable. Sodium tetraborate is the preferred gellant, however, because it also acts as a buffer to maintain the pH of the system at a level high enough to permit gelling of the poly(vinyl alcohol). Other workable gellants include, but are not limited to: resorcinol, catechol, gallic acid, 2-4-dihydroxy benzoic acid and congo red dye.

Poly(vinyl alcohol) as used in the present invention is a cream-colored powder which is soluble in water and insoluble in most organic solvents. It is made by the hydrolysis of poly(vinyl alcohol) and contains from about 1% to about 22% acetyl groups.

Poly(vinyl alcohol) may be partially or fully hydrolyzed. It varies in molecular weight according to the length of the resin chain. Both the degree of hydrolyzation and molecular weight independently affect the thermal stability of the dough.

The thermal stability of poly(vinyl alcohol) increases as both the degree of hydrolyzation and molecular weight increases. The disclosed modeling dough that is made with a more fully hydrolyzed grade of poly(vinyl alcohol) and/or a higher molecular weight of poly(vinyl alcohol) has a better thermal stability than a dough made with poly(vinyl alcohol) that is less hydrolyzed and/or has a lower molecular weight.

Thermal stability testing is done at 60° C. (145° F.) for ten days, because these conditions have been adopted by the paint and coatings industry as an approximation of three years of shelf-life. The dough should show little change in consistency, functionality and color.

If the molecular weight of the poly(vinyl alcohol) is too low, the dough will not pass thermal stability testing. However, if the degree of hydrolysis is too high, the resulting dough may be thermally stable but would be too crumbly and brittle and would not perform acceptably. A proper balance is struck by either a medium molecular weight (85,000–146,000), partially hydrolyzed (87–89%) poly(vinyl alcohol) or a near fully hydrolyzed (96.5–97.5%) low/medium molecular weight (31,000–146,000) poly(vinyl alcohol). These resin grades are the preferred resin grades because they impart better thermal stability coupled with acceptable performance properties. Among the useful poly(vinyl alcohol) resins are those sold under the tradenames Airvol 523 and Airvol WS42 by Air Products & Chemicals, Inc. and Elvanol 52-22 by E. I. dupont de Nemours and Company. The poly(vinyl alcohol) resin is preferably present in compositions of the invention in an amount of from about 4% to about 15% by weight of the composition. The poly(vinyl alcohol) resin is more preferably present in compositions of the invention in an amount of from about 8% to about 12% by weight of the composition.

If bounceability of the dough is a requisite feature of the product, then a lower molecular weight, partially hydrolyzed poly(vinyl alcohol) such as Airvol 203 or Airvol 205 should be used. This resin grade also produces doughs that are especially resistant to cracking. However, doughs made with this resin grade have reduced thermal stability and will have a shorter shelf-life.

Dry shrinkage is another problem inherent in water-based doughs disclosed in the prior art and overcome by the present invention. The present invention overcomes this problem by incorporating a filler that bonds with the gelled poly(vinyl alcohol) resin to form an adequate matrix. The water evaporates upon drying without substantial shrinkage to the sculpture or other molded object. Workable filler, in the amount of 10 to 30 weight percent, include hollow composite microspheres, inert talc, calcium carbonate, mica, clay or ceramic particles and combinations thereof. Most preferred in compositions of the invention is a concentration of filler in an amount of from about 25% to about 26% by weight.

The hollow composite microspheres are the preferred filler primarily because of the low cost. They are functionally desirable because they are lightweight (having density of about 0.13 g/cc) and lower the density of the modeling dough.

The hollow composite microsphere filler incorporated in the modeling dough disclosed by the present invention is especially helpful in preventing the molded object or sculpture from shrinking upon drying. While the weight percent of water in the present invention is high (40% to 60%), the actual partial volume of water is relatively low due to the relatively high density of water (1.0 g/cc) and low density of the microspheres. An even more preferred range of water content in compositions of the inventions is from about 43% to about 49% by weight.

As a result of these relative weights, the hollow microspheres constitute the majority of the volume of the dough. The poly(vinyl alcohol) and the microspheres bind together to give a sufficient structural integrity for molding. Thus, when the water evaporates, the dough does not lose a large percentage of its total volume.

The preferred filler consists essentially of hollow composite microspheres of about 50 micron diameter and having a wettable particulate coating. Microspheres with a larger diameter are workable but may give the dough a grainy texture. Microspheres with a smaller diameter may result in a heavier dough but result in a smoother texture. Thus, the choice of a particular size is determined by the desired end properties.

The microsphere coating facilitates the wetting of the microspheres by the liquid ingredients of the dough. The coating also contributes to the smooth feel and inhibits stickiness in the final product, thereby allowing easy manipulation. The preferred coating is calcium carbonate. Other coatings include talc, alumina trihydrate, and titanium dioxide, as well as functional components such as pigments and dyes.

One preferred coated microsphere is sold under the tradename Dualite TM M6001AE by Pierce & Stevens. M6001AE is an ultra-low density, resilient, polymeric microsphere coated with calcium carbonate. It is a lightweight filler that reduces density of the dough and occupies the volume not attributable to water and resin. The resilient polymeric microspheres are shear stable and impact resistant, thus remaining intact under formulation conditions. Other hollow composite microsphere fillers useful in the composition of the invention have densities ranging from 0.10 to 0.75 g/cc, and include the wettable particulate coatings discussed above.

Other workable microspheres are available in various sizes and densities. Ceramic microspheres range in diameter from 15 to 40 microns and have a density of about 0.7 g/cc. However, the ceramic microspheres give the dough a grainier texture and a brownish coloring. Silica alumina alloy microspheres range in diameter from 1 to 100 microns and have densities ranging from 2.1 to 2.5 g/cc, depending upon the wall thickness. Plastic microspheres made from a variety of materials are available in sizes ranging from 10 to 1000 micron diameter and densities ranging from 0.13 to 0.95 g/cc. Any of these materials, or combinations of such materials, may be employed for the purpose of achieving particular combinations of properties.

The preferred composition of the modeling dough disclosed by the present invention incorporates six additional optional components: (1) a defoamer; (2) a wetting agent or dispersant; (3) a humectant; (4) a preservative; (5) a colorant; and (6) a buffer.

A defoamer is used to eliminate air bubbles upon mixing of the components, and such additives are readily available from numerous sources. The amount of defoamer is not critical, though such materials are typically used in amounts of from about 1 to 2% by weight. Balab Bubblebreaker 748, an aliphatic oil and surfactant mixture, or any other of the commercially available defoamers are equally suitable.

The wetting agent promotes dispersion of the microspheres and of any particulate colorant during the mixing of the disclosed modeling dough, and such materials are well known. One preferred wetting agent is sold under the tradename Nopcosperse 44 by Henkel, a non-ionic polyelectrolyte. The preferred weight percent of wetting agent is from about 0 to about 2%.

The humectant is not an essential component, but it is preferably added to help plasticize the poly(vinyl alcohol). Without the humectant, the disclosed modeling dough may be more brittle. The preferred humectants are triglycerol and glycerin because they are superior plasticizers in this system and produce a dough with a smooth texture. Alternative, yet satisfactory, humectants are propylene glycols, poly(ethylene glycols) (i.e. Carbowax 200) and diethylene glycol. The humectant may be present in an amount of from about 0 to about 20% by weight.

A desirable additive that increases shelf-life is a preservative, and a wide variety of such materials is available commercially. One preferred preservative is Kathon LX1.5, a 1.5% solution of isothiazolines. Another preferred preservative is Nuosept 95. The preferred weight percent of preservative is from about 0.15% to about 0.75%.

If no colorant is used, the resulting dough is white. A white dough has many applications because it can be easily painted with water-base paints. Also, white is an attractive color in itself and has many applications without the need for painting. If a colored dough is desired, a variety of pigments and dyes may be used. Fluorescent doughs are especially attractive to children. Fluorescent pigments that work especially well include those sold under the trade names Aurora Pink Z-11-3, Saturn Yellow Z-17N and Signal Green Z-18-3.

A buffer may also be added to raise the pH in some formulations. When the pH is below 7.0, the poly(vinyl alcohol) does not gel properly. If boric acid is used as the gellant, the pH tends to drift and creates the need for a buffer. Also, formulations using low molecular weight, partially hydrolyzed poly(vinyl alcohol) resins are acidic and require a buffer. However, one appropriate buffer is sodium tetraborate, which is also the preferred gellant. None of the examples disclosed below contain a buffer other than the sodium tetraborate gellant because the pH levels are sufficiently high. Alternative buffers, when needed due to a pH below 7.0, include 2-amino-2-methyl-1-propanol and sodium bicarbonate. The preferred amount of this additive, when used, is from about 0 to about 1% by weight.

EXAMPLES

While only four formulations are set forth below in the four examples, alternative formulations will be apparent to those skilled in the art. Such artisans will be able to modify the formula with an eye toward the desired performance properties and intended use, both of which may vary widely. The evaluation of any single formulation is therefore inherently subjective.

When altering the formulas disclosed below it is important to maintain a pH level near 7.5 or higher. Doughs with a pH below 7.0 may ungel and become sticky and difficult to handle. As stated above, a buffer may alleviate this problem.

The modeling doughs disclosed by the present invention are made by first dissolving the poly(vinyl alcohol) resin in water to form about a 20% solution. The solution must be heated (185° F.) to get the poly(vinyl alcohol) to dissolve. Then, the rest of the liquid components, except the gellant, are blended in a mixer. An aqueous solution of the gellant is added last. Agitation should be stopped before the microspheres are added because they are very light and aerate easily. The mixture should be covered before agitation is restarted. Once a homogenous, creamy mixture is obtained, the gellant is added.

Sodium tetraborate, the preferred gellant, is dissolved in water to form a 2% to 4% solution. Higher concentrations require heat to dissolve the sodium tetraborate. The solution should be added dropwise and slowly over the creamy mixture as it is blended. The amount of gellant added is determined by the preferred texture and softness of the final product.

The modeling doughs disclosed by the present invention have a drying time of about 24 to about 48 hours and a shelf-life (in the wet state) of about 2 years at room temperature.

Modeling doughs disclosed by the present invention were produced by mixing the following components, the amounts being expressed in weight percent:

| Example 1 | |
|---|---|
| Component | Amount |
| Airvol WS42 medium/low molecular weight 96.5-97.5% hydrolyzed | 7.46 |
| water | 54.57 |
| Dualite TM microspheres | 22.72 |
| sodium tetraborate | 0.51 |
| Balab Bubblebreaker 748 | 1.10 |
| Nopcosperse 44 | 0.55 |
| glycerin | 12.94 |
| Kathon LX1.5 | 0.15 |
| | 100.00 |

The modeling dough of Example 1 is not sticky and is easy to manipulate. It has a somewhat powdery texture. However, the dried structure is fairly brittle and the wet dough is not very ductile. The wet dough has a density of 0.41 g/cc and a pH of 7.51.

| Example 2 | |
|---|---|
| Component | Amount |
| Airvol 205 medium/low molecular weight 87-89% hydrolyzed | 10.76 |
| water | 56.79 |
| Dualite TM microspheres | 17.34 |
| sodium tetraborate | 0.28 |
| Balab Bubblebreaker 748 | 1.78 |
| Nopcosperse 44 | 0.89 |
| triglycerol | 12.01 |
| Kathon LX1.5 | 0.15 |
| | 100.00 |

The dough of Example 2 exhibits excellent bounceability, has excellent plasticity, is very ductile and is resistant to cracking. The dried dough is strong. However, the wet dough is not as thermally stable as the dough disclosed in Example 1 and, therefore, has a shorter shelf-life. The wet dough has a density of 0.45 g/cc and a pH of 7.66.

| Example 3 | |
|---|---|
| Component | Amount |
| Airvol 523 medium molecular weight 87-89% hydrolyzed | 8.60 |
| water | 48.64 |
| Dualite TM microspheres | 25.50 |
| sodium tetraborate | 0.28 |
| Balab Bubblebreaker 748 | 1.27 |
| Nopcosperse 44 | 0.64 |
| glycerin | 14.92 |
| Kathon LX1.5 | 0.15 |
| | 100.00 |

The dough of Example 3 is fairly ductile, has good plasticity and the dried dough has good strength. The wet dough has a density of 0.37 g/cc and a pH of 7.48. Dough produced according to Example 3 has plasticity measured as from 2 to 2.5.

| Example 4 | |
|---|---|
| Component | Amount |
| Airvol 523 medium molecular weight 87-89% hydrolyzed | 11.88 |
| water | 43.61 |
| Dualite TM microspheres | 25.37 |
| sodium tetraborate | 0.16 |
| Balab Bubblebreaker 748 | 1.40 |
| Nopcosperse 44 | 0.71 |
| glycerin | 16.52 |
| Kathon LX1.5 | 0.15 |
| Nuosept 95 | 0.20 |
| | 100.00 |

Following additional study and experimentation, the dough of Example 4 was formulated and prepared. This dough was designed to reduce minor cracking problems that may arise as the dough dries. Cracking was found to be reduced by increasing the percentage content of poly (vinyl alcohol) in relation to the glycerin content. As a result of this increased poly (vinyl alcohol) content, the end product was strengthened and any cracking associated with previous formulations was minimized.

In arriving at the formulation for Example 4, the ratio of resin to glycerin was increased. This increase produces a dough which is stiffer than the previous examples. For the formulation of Example 4, the plasticity was measured as 2.6 mm.

In addition, the formulation of Example 4 required less borate to achieve the desired gel strength for the dough. Further, a lower borate concentration suitably served as a buffer for the composition. The pH of the formulation of Example 4 was measured at 7.8.

A further benefit of the formulation of Example 4 is that less water was needed to complete the composition. The lower water content is beneficial in that it results in a drier, stiffer dough that dries in a shorter period of time upon use by the consumer. The dough of Example 4 did exhibit a very minor amount of cracking when formed into large, thick pieces. However, the performance of the dough was more than suitable for the intended applications.

All of the doughs disclosed are easily washed from skin, carpeting, textiles and other surfaces. In fact, the modeling dough disclosed by the present invention acts to clean the skin if the dough is pressed against the skin and then removed. Similarly, the disclosed modeling dough exhibits the ability to pick up newsprint.

While specific weight percent ranges of the components of preferred compositions have been set forth in this disclosure, the specific proportions of the components are not narrowly critical to the practice of the present invention.

From the foregoing description and examples, it is apparent that the objects of the present invention have been achieved. While only certain embodiments have been set forth, alternative embodiments and various modifications will be apparent to those skilled in the art. These and other alternatives are considered equivalents and within the spirit and scope of the present invention.

What is claimed:

1. A water-based moldable modeling dough composition comprising poly(vinyl alcohol), water, a gellant, and a filler, said composition having a pH of about 7.0 or greater, and said filler consisting essentially of plastic microspheres.

2. The composition of claim 1, wherein said plastic microspheres have a wettable particulate coating.

3. The composition of claim 2, said plastic microspheres having a density of from about 0.10 to about 0.75 g/cc.

4. The composition of claim 1, wherein said poly(vinyl alcohol) is at least partially hydrolyzed.

5. The composition of claim 1, wherein said poly(vinyl alcohol) is substantially fully hydrolyzed.

6. The composition of claim 1, further comprising a buffer.

7. The composition of claim 6, wherein said buffer is selected from the group consisting of sodium tetraborate, sodium bicarbonate, 2-amino-2-methyl-1propanol, and mixtures thereof.

8. The composition of claim 1, wherein said gellant is a water soluble borate salt.

9. The composition of claim 1, wherein said gellant is sodium borate.

10. The composition of claim 1, wherein said gellant is a sodium tetraborate.

11. The composition of claim 1, further comprising a defoamer.

12. The composition of claim 1, further comprising a wetting agent.

13. The composition of claim 1, further comprising a humectant.

14. The composition of claim 13, further comprising, by weight, from about 0 to about 20 percent humectant.

15. The composition of claim 14, wherein said humectant is selected from the group consisting of glycerin, triglycerol, propylene glycol and poly(ethylene glycols).

16. The composition of claim 1, further comprising a colorant.

17. The composition of claim 1, further comprising a preservative.

18. A water-based moldable modeling dough composition comprising, by weight: from about 4% to about 15% poly(vinyl alcohol), from about 40% to about 60% water, from about 10% to about 30% filler, from about 1% to about 2% defoamer, from 0% to about 2% wetting agent, from about 0.1% to about 2% gellant, from 0% to about 20% humectant, from 0% to about 4% colorant, and from 0% to about 2% preservative, and said filler consisting essentially of plastic microspheres.

19. The composition of claim 18, wherein said plastic microspheres have a wettable particulate coating.

20. A water soluble moldable molding dough composition comprising, by weight, of from about 8% to about 12% poly(vinyl alcohol), from about 0.15% to about 0.3% sodium tetraborate, from about 25% to about 26% coated plastic microspheres, and from about 43% to about 49% water.

21. The composition of claim 20, wherein said poly(vinyl alcohol) is at least partially hydrolyzed.

22. The composition of claim 20, wherein said coated plastic microspheres have a wettable particulate coating.

23. The composition of claim 22, wherein said wettable particulate coating of said plastic microspheres is calcium carbonate.

* * * * *